United States Patent
Kushnir et al.

[11] Patent Number: 5,831,232
[45] Date of Patent: Nov. 3, 1998

[54] PNEUMATIC EMERGENCY BRAKE APPLICATION VALVE AND AN ASSOCIATED ELECTRICAL SIGNALING SWITCH

[75] Inventors: Lawrence M. Kushnir, North Huntingdon; Brian L. Cunkelman, Blairsville, both of Pa.

[73] Assignee: Westinghouse Air Brake Company, Wilmerding, Pa.

[21] Appl. No.: 747,979

[22] Filed: Nov. 12, 1996

[51] Int. Cl.⁶ .................................................... H01H 3/04
[52] U.S. Cl. ............................................ 200/61.87; 303/50
[58] Field of Search .................. 116/58 R, 58 A; 180/370; 188/71.1, 72.4, 72.1, 106 F, 151 R, 352; 200/61.12, 61.87, 61.89, 61.85, 61.86, 81 H, 81 R, 82 C, 82 D, 83 Q, 837, 332, 334, 335; 303/50, 51, 127; 74/512, 514

[56] References Cited

U.S. PATENT DOCUMENTS

| | | | |
|---|---|---|---|
| 2,258,783 | 10/1941 | McNeal | 303/47 |
| 2,276,028 | 3/1942 | Dick | 200/59 |
| 2,484,940 | 10/1949 | Franzheim | 137/139 |
| 3,461,425 | 8/1969 | Schultz et al. | 340/71 |
| 3,576,529 | 4/1971 | Garrison | 340/72 |
| 4,286,826 | 9/1981 | Leiber | 303/114 |
| 4,305,623 | 12/1981 | Seabase | 303/54 |
| 4,318,091 | 3/1982 | Fulmer | 340/626 |
| 4,653,813 | 3/1987 | Burgdorf | 303/50 |
| 4,953,444 | 9/1990 | Cunningham et al. | 91/1 |

*Primary Examiner*—Michael A. Friedhofer
*Attorney, Agent, or Firm*—John B. Sotak

[57] ABSTRACT

A manually operable pneumatic emergency brake valve and electric switch including a valve body having an inlet port and an outlet port, an internal valve assembly normally seated by the biasing force of a helical spring, a pair of pivotal levers for operating a movable valve stem to unseat said internal valve assembly, and said movable stem including a cam surface for actuating the electric switch to signify an emergency brake application.

19 Claims, 1 Drawing Sheet

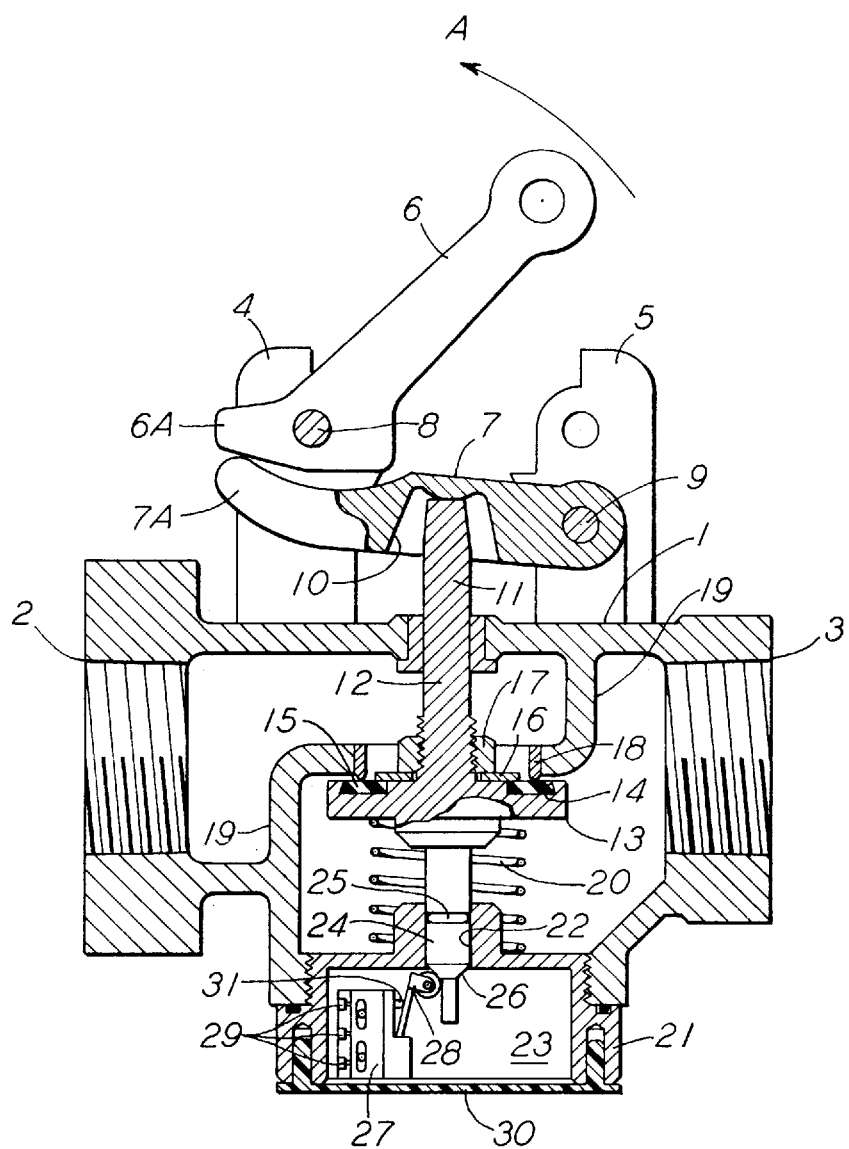

5,831,232

PNEUMATIC EMERGENCY BRAKE APPLICATION VALVE AND AN ASSOCIATED ELECTRICAL SIGNALING SWITCH

FIELD OF THE INVENTION

This invention relates to a pneumatic brake valve and electrical switch arrangement and, more particularly, to a pneumatic emergency brake application valve and an electrical signaling switch for signifying when an emergency brake application is manually initiated by moving the emergency brake valve to its full operating position which effectively results in exhausting the air in the brake pipe to atmosphere at an emergency rate.

BACKGROUND OF THE INVENTION

In electronic air brake equipment, employing microprocessor-based systems, it is desirable to continuously monitor the condition of pneumatic devices and to communicate this information to the brake and cab control computers. Presently, there is no means to verify when an emergency brake application has been initiated by manual operation of the pneumatic emergency brake valve. That is, in existing electropneumatic integrated control brake equipment, the microprocessor is unaware of an emergency brake application which is initiated by manipulation of the emergency brake valve. Thus, it would be highly desirable to provide an electrical interface between the pneumatic emergency brake valve and the microprocessor of the electro-pneumatic integrated control brake equipment.

OBJECTS AND SUMMARY OF THE INVENTION

Accordingly it is an object of this invention to provide a means of electrically monitoring the operation of an emergency brake valve.

Another object of this invention is to provide an emergency brake valve having an electrical switch for signaling an emergency brake application.

A further object of this invention is to provide a manually operable pneumatic emergency brake application valve which actuates an electrical switch to signify an emergency brake application.

Yet, another object of this invention is to provide an electrical switch for sensing the position of a manually operable pneumatic emergency brake valve.

Yet, a further object of this invention is to provide a combination of a pneumatic emergency brake valve and an electric subminiature switch for determining when an emergency brake application is initiated by the emergency brake valve.

Still another object of this invention is to provide a new and improved emergency brake valve and a microswitch which produces a signal during an emergency brake application.

Still a further object of this invention is to provide a manually operable pneumatic emergency brake valve and electric switch comprising, a valve body having an inlet and an outlet, an interval valve assembly normally seated by the force of a valve spring, a pair of pivotal levers for operating a movable valve stem to unseat the interval valve assembly, and said movable stem including a cam for actuating the electric switch to signify an emergency brake application.

DESCRIPTION OF THE DRAWING

The above objects and other attendant features and advantages will be more readily appreciated as the present invention becomes better understood by reference to the following detailed description when considered in conjunction with the accompanying drawing wherein:

The single Figure of the drawing is an elevational view, partially in cross-section, of an emergency brake valve and electric switch for interfacing with a microcomputer of an electropneumatic integrated control braking equipment in accordance with the present invention.

DETAILED DESCRIPTION OF THE INVENTION

Referring now to the single Figure of the drawing, there is shown a partial cross-sectional, elevational view of a manually operable pneumatic emergency brake valve and electric switch which may be interfaced with the input of a microprocessor of an electropneumatic brake system in accordance with the present invention. As shown, the emergency brake valve includes a valve body 1 having a female threaded inlet 2 and a female threaded outlet 3. The body member 1 includes a pair of spaced apart stanchions or upstanding members 4 and 5. A pair of operating levers 6 and 7 are pivotally connected to stanchions 4 and 5, respectively. That is, outer lever 6 is pivotally connected to stanchion 4 by a pivot pin 8 while the inner lever 7 is pivotally connected to stanchion 5 by a pivot pin 9.

It will be noted that the intermediate portion of the inner pivotal lever 7 includes a recess 10 which receives the exposed end 11 of a valve stem 12. The major portion of the valve stem 12 is disposed within the valve body 1. As shown, the intermediate portion of the valve stem 12 includes an enlarged annular portion 13 which includes an annular groove 14 formed in the upper surface thereof. A rubber or elastic valve seal 15 is positioned into the annular groove 14. A flat washer 16 and a lock nut 17 hold the valve seal 15 in the groove 14 so that it normally engages a valve seat 18 which is press-fitted into an internal dividing wall 19 formed in the valve body 1. It will be noted that a helical biasing spring 20 is caged between the underside of the enlarged stem portion 13 and the top of a cap nut 21. A through hole 22 is formed in the upper end of the cap nut 21 and extends into chamber 23. As shown, the lower end 24 of the valve stem 12 is disposed within the through hole 22 and includes an O-ring seal 25, a tapered or cam surface 26.

A microswitch or ultra-subminiature electric switch 27 is suitably mounted in chamber 23. The electric switch may be a sealed multicontact snap-action switch which includes a roller lever actuator 28 and has suitable terminals 29 which may be hard wired to the appropriate inputs of the microprocessor or computer of the electro-pneumatic brake control system. As shown, the chamber 23 is sealed against dust, water and other contaminants by a protective cover 30 which is suitably secured to the bottom of the cap nut 21. The emergency brake valve is shown in its closed position in which the pressurized inlet 2 is isolated from the exhaust outlet 3 by the seated valve seal 15 and valve seat 18. Now when the lever 6 is manually moved in a counter-clockwise direction, as illustrated by the arrow A, the lower toe portion 6A engages the end portion 7A and depresses the lever 7. The depression of the lever 7 causes the downward movement of the valve stem 12 which unseats the valve seal 14 from the valve seat 18. The opening of the valve causes the pressurized air in the inlet 2 to be vented to atmosphere via outlet 3 so that an emergency brake application is initiated. At the same time, the downward movement of the valve stem 12 causes the cam 26 to move the roller lever 28 in a counter-clockwise direction. The counter-clockwise movement of the roller lever 28 depresses the plunger 31 which causes the snap-action for opening and/or closing of the electrical contacts of the switch 27. Thus, electrical signal is conveyed to the microprocessor or computer via terminals 29 to signify that an emergency brake application has emanated from the emergency brake valve 1.

Now when the handle 6 is released, the force of the helical spring 20 will return the emergency brake valve to the position as shown in the drawing in which the inlet 2 is isolated from the outlet 3.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. A manually operable pneumatic emergency brake valve and electric switch comprising, a valve body having an inlet and an outlet, an internal valve assembly normally seated by the force of a valve spring, a pair of pivotal levers for operating a movable valve stem to unseat said internal valve assembly, said internal valve assembly includes a valve seat and valve seal which is located in an annular groove formed in an intermediate flange portion carried by said movable stem, and said movable stem including a cam for actuating the electric switch to signify an emergency brake application.

2. The manually operable pneumatic emergency brake valve and electric switch as defined in claim 1, wherein said electric switch is a microswitch.

3. The manually operable pneumatic brake emergency brake valve and electric switch as defined in claim 1, wherein said electric switch is located in a cap nut which is screwed onto said valve body.

4. The manually operable pneumatic emergency brake valve and electric switch as defined in claim 3, wherein said cap nut includes a protective cover.

5. The manually operable pneumatic emergency brake valve and electric switch as defined in claim 1, wherein said electric switch is a sub-miniature switch.

6. The manually operable pneumatic emergency brake valve and electric switch as defined in claim 1, wherein said electric switch includes a roller lever actuator which engages said cam.

7. The manually operable pneumatic emergency brake valve and electric switch as defined in claim 1, wherein said valve spring is a helical spring.

8. The manually operable pneumatic emergency brake valve and electric switch as defined in claim 1, wherein said electric switch is situated in a removable cap nut which is secured to said valve body.

9. The manually operable pneumatic emergency brake valve and electric switch as defined in claim 8, wherein a cover member is attached to said cap nut to protect said electric switch.

10. The manually operable pneumatic emergency brake valve and electric switch as defined in claim 1, wherein said electric switch is a roller actuator sub-miniature switch.

11. The manually operable pneumatic emergency brake valve and electric switch as defined in claim 10, wherein said roller actuator sub-miniature switch is operated by said cam.

12. The manually operable pneumatic emergency brake valve and electric switch as defined in claim 1, wherein said electric switch is actuated by a roller lever.

13. The manually operable pneumatic emergency brake valve and electric switch as defined in claim 12, wherein said cam engages said roller lever.

14. The manually operable pneumatic emergency brake valve and electric switch as defined in claim 1, wherein said electric switch includes a number of terminals.

15. The manually operable pneumatic emergency brake valve and electric switch as defined in claim 14, wherein said electric switch includes a depressible button which is actuated by a lever roller.

16. A manually operable pneumatic emergency brake valve and electric switch comprising, a valve body having an inlet and an outlet, an internal valve assembly normally seated by the force of a valve spring, a pair of pivotal levers for operating a movable valve stem to unseat said internal valve assembly, said movable stem including a cam for actuating the electric switch to signify an emergency brake appliation, said electric switch is situated in a removable cap which is secured to said valve body, and said movable valve stem includes an enlarged annular portion which carries a valve seal.

17. A manually operable pneumatic emergency brake valve and electric switch comprising, a valve body having an inlet and an outlet, an internal valve assembly normally seated by the force of a valve spring, a pair of pivotal levers for operating a movable valve stem to unseat said internal valve assembly, said movable stem including a cam for actuating the electric switch to signify an emergency brake application, said electric switch is situated in a removable cap which is secured to said valve body, said movable valve stem includes an enlarged annular portion which carries a valve seal, and said valve spring is situated between said underside of said enlarged annular portion and the topside of said cap nut.

18. A manually operable pneumatic emergency brake valve and electric switch comprising, a valve body having an inlet and an outlet, an internal valve assembly normally seated by the force of a valve spring, a pair of pivotal levers for operating a movable valve stem to unseat said internal valve assembly, said movable stem including a cam for actuating the electric switch to signify an emergency brake application, said electric switch is situated in a removable cap which is secured to said valve body, said movable valve stem includes an enlarged annular portion which carries a valve seal, said valve spring is situated between said underside of said enlarged annular portion and the topside of said cap nut, and said valve spring is a helical spring.

19. A manually operable pneumatic emergency brake valve and electric switch comprising, a valve body having an inlet and an outlet, an internal valve assembly normally seated by the force of a valve spring, a pair of pivotal levers for operating a movable valve stem to unseat said internal valve assembly, said movable stem including a cam for actuating the electric switch to signify an emergency brake application, said electric switch is situated in a removable cap which is secured to said valve body, said movable valve stem includes an enlarged annular portion which carries a valve seal, said valve spring is situated between said underside of said enlarged annular portion and the topside of said cap nut, said valve spring is a helical spring, and said helical spring is caged between said enlarged annular portion and said cap nut.

* * * * *